Feb. 19, 1952     E. F. PITRE     2,586,254
SUGAR CANE STUBBLE DIGGER

Filed Dec. 16, 1946

*Inventor*

Ernest F. Pitre

By *Clarence A. O'Brien and Harvey B. Jackson*

*Attorneys*

Patented Feb. 19, 1952

2,586,254

UNITED STATES PATENT OFFICE 2,586,254

SUGAR CANE STUBBLE DIGGER

Ernest F. Pitre, New Iberia, La.

Application December 16, 1946, Serial No. 716,572

1 Claim. (Cl. 97—179)

This invention relates generally to agricultural implements, and more particularly to a sugar cane stubble digger in which a plurality of freely rotatable members, each carrying a plurality of curved teeth, are each yieldably supported on a frame adapted to be hitched to the rear end of a tractor or otherwise dragged over a cultivated field.

An object of this invention is to provide a device of this character which is admirably suited for use with a plow or disc harrow, the plow or disc harrow being made to precede the present invention and to perform the initial steps in breaking up the stubble.

Another object of this invention is to provide a device which will free the clumps of stubble from the superficial soil so that the roots of the stubble can derive moisture, air and light, the stubble growth being left on the surface of the ground to sprout in the spring.

Another object of this invention is to provide means for automatic lateral cultivation, that is, movement of certain portions of the soil in directions substantially normal to the direction of movement of the frame or more specifically through the arcs inscribed by the points of the teeth as the generally circular toothed members are pulled through the soil.

Another object of this invention is to provide a device in which the cultivating members are free to oscillate within certain predetermined limits, in a transverse direction, so that obstacles encountered as the digger is pulled through the soil are avoided and by-passed without injuring the teeth of the digger members.

A still further object of this invention is to provide a device of this character which in use will not become fouled or clogged with stubble, and in which the bearing members are disposed well above the loose soil and thus are more easily kept in proper lubricated condition.

And a last object to be specifically mentioned is to provide a device of this general character which is inexpensive and simple to manufacture, adapted to remain in upright position when not in use and therefore more easily coupled to tractors or trailers, easily adjustable as to width, and which is so engineered and designed as to make the device very sturdy, not likely to get out of order, and very durable in service.

With these and other objects in view as will appear hereinafter, this invention consists of certain novel features of construction, combination and arrangement of parts as will be hereinafter described in detail and particularly set forth in the appended claim, reference being had to the accompanying drawings which form a material part of this application, and in which:

Similar characters of reference designate similar or identical parts and portions throughout the specification and the several views of the drawing.

Figure 1:
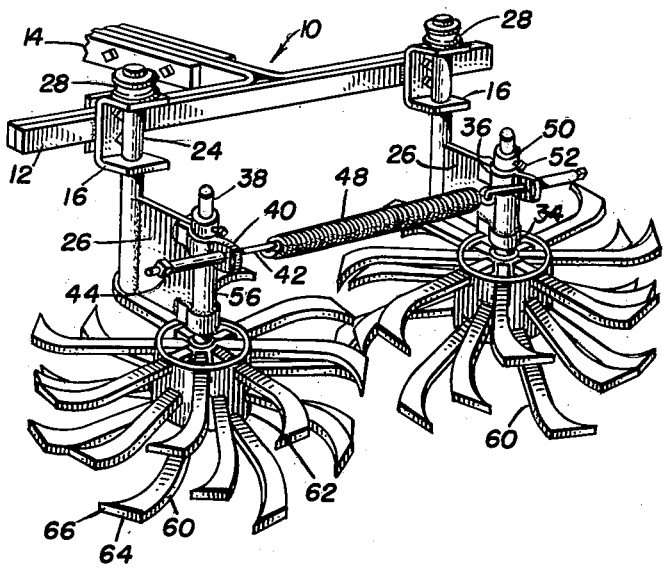
Figure 1 is a perspective view of the assembled device, a portion of the hitch for the implement being broken away.
Figure 2:
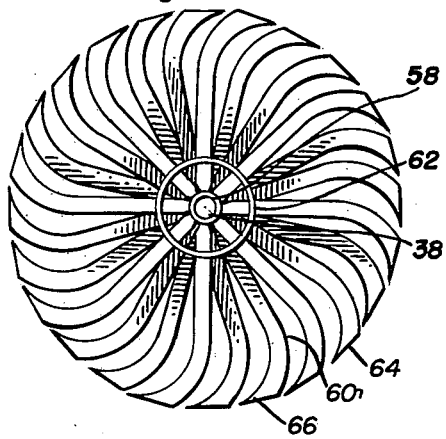
Figure 2 is a bottom plan view of the multiple toothed digger member.
Figure 3:
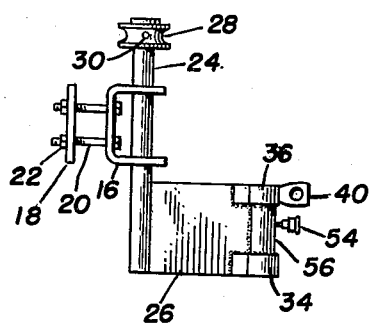
Figure 3 is an enlarged detail view of the pivoted bearing member.
Figure 4:
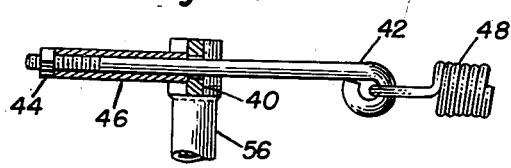
Figure 4 is an enlarged fragmentary detail view of the spring supporting structure and contiguous portions, the view being taken from the rear of the implement and being elevational in character with certain portions being shown in section to clarify the illustration and to amplify the disclosure of this invention.

Referring now to the drawings in detail, a T frame generally indicated by the numeral 10, and including cross bars 12, is provided with a hitch, secured adjacent the portion 14, but not shown in these drawings as the type of hitch is considered as immaterial to this invention. A pair of U-shaped bracket members 16 are secured in spaced relation on the cross member 12, by means of an abutment plate 18, bolts 20 and nuts 22, the brackets 16 being normally spaced equally from the center of the T frame 10. The horizontally disposed flanges of the brackets 16 are each apertured to receive the upwardly extending pivot pin portion 24 which may be made integral with the plate 26, and is equipped at the other end thereof with an adjustable collar 28, securable to the pivot pin 24 by means of a set screw 30, thus allowing for limited vertical adjustment of the plate 26. This plate 26 is essentially a spacer member for the double bearings 34 and 36 formed on the rearward end of this plate, adapted to receive the vertical shaft 38. It will be understood, of course, that these brackets, plates, bearings and shafts 38 are all in duplicate, the right hand portion of the implement being essentially a duplication of the left hand portion.

A rearwardly extending apertured flange 40 is secured to each plate 26 adjacent the bearing 36, and an eye bolt 42 is secured in each of these flanges with the eye disposed towards the center of the implement and a threaded portion and a nut 44 is provided to coact with a sleeve 46 to allow for the longitudinal adjustment of each bolt relative to the flanges 40. A relatively strong helical spring 48 is terminally secured to the eyes of the two bolts 42, and it will now be clear that this structure provides for the independent movement of either of the arms or plates 26 outwardly or away from the other plate, such movement being a pivotal movement about the pivot pins 24, or both these said units may move together to the left or to the right, to avoid and by-pass an obstruction implanted in the soil and thus to prevent damage to the implement. A collar 50 provided with a set screw 52 is associated with the upper end of each of the shafts 38 to allow for the vertical adjustment of the shafts, these collars being adapted to abut on the lower faces thereof the tops of the bearing portions 36, and a grease fitting 54 may be secured intermediate the length of a tubular portion 56 provided on the outer end of the plates 26, this tubular portion 56 registering with and coacting with the bearings 36 and 34, to firmly support the shaft 38.

Secured to the lower ends of each of the shafts 38 is a sleeve 58 to which a plurality of radially disposed teeth 60 are attached, preferably by welding, and a larger diameter cylindrical member 62, apertured at a plurality of points to receive said teeth at points intermediate the length thereof, is provided to give additional support to these teeth. This cylindrical member 62 may be welded to the individual teeth but it is preferred that these teeth be secured tightly in the recesses provided in the cylinder without welding, thus facilitating the removal of individual teeth for repair and replacement. Each tooth is similar and curved near the outer end thereof, the outer end portions being flat or very slightly arcuate as at 64, and pointed as at 66. A plurality of rows of these teeth may be provided and each tooth is spaced vertically as well as circumferentially in regular order, as illustrated in the drawings, and in the preferred embodiment of this invention the teeth on the outside of each of the rotating members point forwardly and inwardly towards the front of the implement.

With the foregoing description of the mechanical details of this invention in view, many practical uses of this implement will occur to the agriculturist, the use for which this machine has been specially designed, namely the cultivation of sugar cane stubble, being only one of many such fields of utility. When the machine is dragged over the cultivated field, the soil presents less interference for the points 66 of the teeth than for the corresponding blunt heel portions of these teeth. Consequently a torque is produced on the shafts 38 and the toothed members are made to rotate, this action carrying grass roots and the like from the sides of the machine towards the center, while at the same time cultivating the soil.

Many and various modifications of this invention may be made including changes in the form of the frame 12 which is essentially merely a means of supporting the other portions of the device, and may be deleted entirely when suitable horizontal members are provided in structures wherewith this invention is adapted to be used, for example, in a tractor trailer having a cross member whereon the brackets 16 can be readily secured. Other minor modifications will occur to the manufacturer of this device but all such modifications are matters of individual preferment and mechanical expediency and well within the scope of the appended claim.

Though there has been shown a particular embodiment of this invention, this application is not limited to this particular embodiment, but it is desired to include in the scope of this invention the construction, combination and arrangement of parts substantially as set forth in the appended claim.

Having thus described this invention, what is claimed as new and desired to be secured by Letters Patent is:

A sugar cane stubble digger comprising a supporting frame, a pair of spaced, vertically slidable shafts rotatably mounted on said frame, vertical plates fixed on said shafts and extending horizontally therefrom, vertical bearings on the free ends of said plates, vertically adjustable shafts journaled in said bearings, rotary horizontal digging units on the lower portions of the second named shafts, apertured arms on the plates, eye bolts adjustably mounted on said arms, a coil spring connected to said eye bolts, adjusting nuts threaded on the eye bolts, and spacing sleeves on said eye bolts between the arms and said nuts, said spring yieldingly resisting spreading of the digging units in a horizontal plane.

ERNEST F. PITRE.

REFERENCES CITED

The following references are of record in the file of this patent:

UNITED STATES PATENTS

| Number | Name | Date |
|---|---|---|
| 416,880 | Whitehead | Dec. 10, 1889 |
| 1,081,437 | De Long | Dec. 16, 1913 |
| 1,610,587 | Randolph et al. | Dec. 14, 1926 |
| 2,061,694 | Cuddigan | Nov. 24, 1936 |
| 2,196,636 | Longman | Apr. 9, 1940 |
| 2,388,689 | Herbert | Nov. 13, 1945 |

FOREIGN PATENTS

| Number | Country | Date |
|---|---|---|
| 330,040 | Germany | Dec. 3, 1920 |